March 20, 1956   H. A. THOMPSON, JR   2,738,706
BACK-LIGHTED PROJECTION SCREENS
Filed April 4, 1952
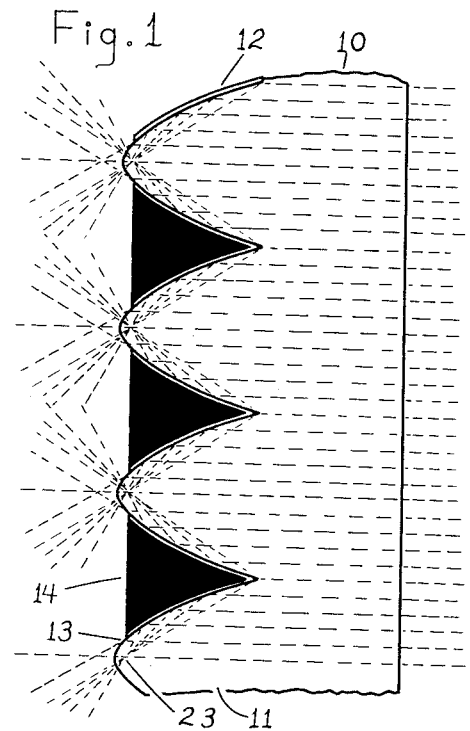
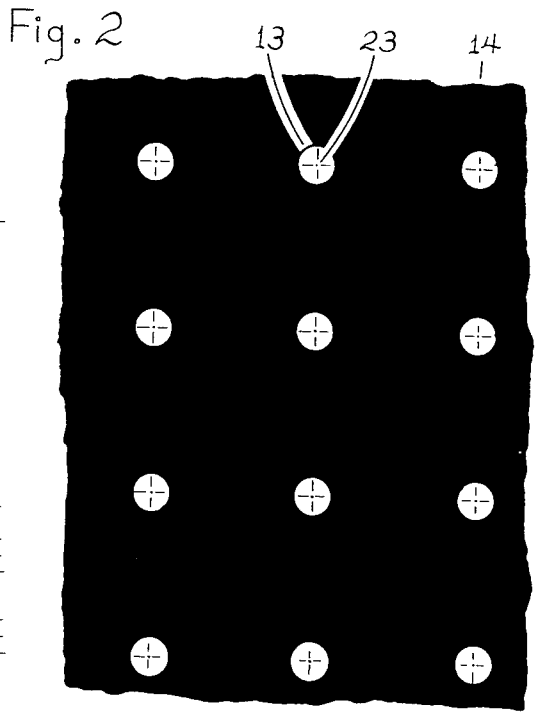
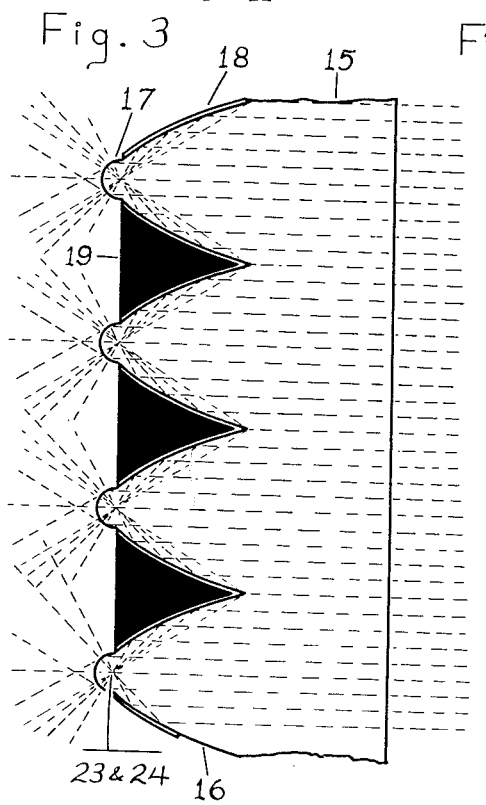
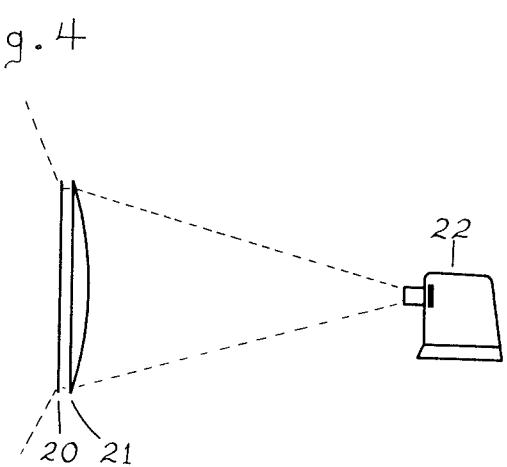
INVENTOR
Harvey A. Thompson Jr.

United States Patent Office 2,738,706
Patented Mar. 20, 1956

2,738,706

BACK-LIGHTED PROJECTION SCREENS

Harvey A. Thompson, Jr., Dallas, Tex.

Application April 4, 1952, Serial No. 280,485

2 Claims. (Cl. 88—28.93)

This invention is a non-glare back-lighted projection screen for use with cinema, still, television or any other type of optical projector under average residential lighting conditions and includes an improved version of the back-lighted screen.

Several back-lighted projection screens are in use today but they all have limitations which are not present in the projection screen which I have conceived. The beaded type of back-lighted projection screens presently used consists basically of many tiny transparent spheres partially imbedded into a thin layer of dark colored oqapue material which covers one surface of a flat transparent plate. The spheres are forced into the opaque coating until they form small holes in the opaque material through which a portion of the light from an optical projector focused upon the beaded side of the screen will pass.

Since the beaded side of these screens must be facing the projector, the front surface being flat and glossy reflects the incidental light of the local surroundings unless the screens are given an expensive non-reflective coating. Also the spherical lenses of these screens do not focus exactly through the holes in the opaque coating and they form a considerable amount of chromatic aberration. Another disadvantage of the beaded screen is that all of the light striking the portion of the opaque material between the spheres, which is a considerable percentage of the total area, is completely wasted because it is absorbed.

In place of the spherical lenses used on other screens the back-lighted projection screens of this invention utilize parabolic reflectors which reflect the projected light through small openings located in the centers of the reflectors.

If the focal point of a parabolic reflector is located near its smaller end and the segment of the smaller end is removed to the perpendicular plane intersecting the focal point, parallel rays of light from the proper direction striking the remaining segment of parabolic reflector will be reflected through the opening in the remaining segment, thereby indicating an efficient lens for a projection screen.

To construct a back-lighted projection screen using parabolic reflector lenses the front surface of a flat plate of transparent material is embossed so as to form many small lenses, each of which is shaped so as to form a paraboloid whose axis is perpendicular to the plane of the transparent plate, then the front surface is covered with a highly reflective coating and the crevices between the parabolic reflectors are filled with a dark colored opaque material. To complete the projection screen, openings are made in the reflectors by an abrasive material or by an etching compound to dissolve the exposed portions of the reflective coating.

Figure 1 is a fragmentary cross-section view of the primary back-lighted projection screen showing the approximate proportional arrangement of the reflectors, the refractive lenses, the opaque mask and the transparent base.

Figure 2 is a fragmentary frontal view of the back-lighted projection screen showing the opaque mask which constitutes the major portion of the frontal surface and the exposed portions of the parabolic extensions through which the light is projected.

Figure 3 is a fragmentary cross-section view of a back-lighted screen utilizing improved lens assemblies showing the arrangement of the segmental parabolic reflectors, the semi-spherical refractive lenses, the opaque mask and the transparent base.

Figure 4 is a schematic drawing of a projector focusing an image onto a back-lighted screen through a condensing lens which makes the light rays approximately parallel so that the light may be properly utilized by the projection screen.

The detailed description of the primary back-lighted projection screen (Figure 1) begins with the transparent plate #10 which serves as the structural base around which the rest of the screen is fabricated. The frontal surface of the transparent plate #10 is embossed with many small paraboloid lenses #11, the axis of which are all perpendicular to the transparent plate #10, and whose foci points #23 are near the front of each parabola. A highly reflective coating #12 is applied to the portions of the parabolic extension #11 so that parallel rays of light passing perpendicularly through the rear surface of the transparent plate #10 and striking the perforated reflective coating #12 will be reflected through the exposed refractive portions #13 of the parabolic extensions #11. In order to prevent the frontal surface of the projection screen from reflecting incidental light from frontal angles and producing a glare an opaque dark colored non-reflective material #14 is coated onto the frontal surface of the reflective coating #12 so that the entire frontal surface of the back-lighted projection screen consists of the opaque fill mask #14 and the small refractive portions #13 of the parabolic extensions #11.

The improved backlighted screen of this invention (Figure 3) having lens assemblies of slightly different construction is also fabricated onto a transparent plate #15 and has many small transparent segments of parabolic extensions #16 attached perpendicularly to the front of the transparent plate #15 and a transparent segment of a sphere #17 is attached to each parabolic extension #16 and all is arranged so that the foci point #23 of each segment of parabolic extension coincides with the center #24 of its attached segment of sphere #17.

The segments of parabolic extensions are covered with a highly reflective coating #18 which is in turn covered with an opaque non-reflective material #19 so that the front surface of the improved back-lighted projection screen consists of the opaque non-reflective material #19 and the segment of spheres #17.

Thus the majority of parallel rays of light passing perpendicularly through the back of the improved projection screen will be reflected by the reflective coating #18 perpendicularly through the surfaces of the segment of spheres #17, while the remainder of the parallel rays of light will pass directly through the segment of spheres #17 and be refracted at supplementary angles to the reflected rays of light.

For best results, the light projected upon the screen should be parallel or approximately as shown in Figure 4. The light from the projector #22 passes through a simple condensing lens #21 before reaching the back-lighted projection screen, thus making an image of uniform brightness.

I claim:

1. A backlighted projection screen consisting of juxta-positioned segmental paraboloid reflectors, an opaque perforated mask and a plate of transparent material whose frontal surface is embossed so as to form juxtapositioned lenses of paraboloid shapes with the axis of each paraboloid being perpendicular to the plane of the aforementioned transparent plate; the outer portion of each paraboloid lens having a slope angle greater than 45 degrees to the plane of the screen is covered with a highly reflective coating thus forming said segmental paraboloid reflectors which are in turn covered entirely on the frontal surfaces with a dark colored opaque material thereby making the aforementioned opaque perforated mask thus only said opaque perforated mask and the uncovered central portions of the aforementioned paraboloid lenses are visible from frontal viewpoints; said segmental paraboloid reflectors being shaped and positioned so that parallel rays of light passing perpendicularly through the flat reverse surface of the aforementioned transparent plate and striking said paraboloid reflectors are focused through the uncovered central portions of said paraboloid lenses.

2. A backlighted projection screen consisting of segmental paraboloid reflectors, an opaque perforated mask and a transparent plate whose frontal surface is embossed so as to form many juxtapositioned lenses each of which is a combination of a segmental paraboloid, whose axis is perpendicular to the plane of said transparent plate, and a segmental sphere, proportioned so that each semi-spherical segment intersects its adjoining segmental paraboloid near the plane of the focus points of the paraboloids with the focus of said paraboloid coinciding with the center of curvature of the segmental sphere; each aforementioned segmental paraboloid lens is covered with a highly reflective coating thus forming the aforementioned segmental paraboloid reflectors which are in turn covered on their frontal surfaces with a dark colored opaque material thereby forming the aforementioned opaque perforated mask thus from frontal angles only said segmental spherical lenses and the aforementioned opaque perforated mask are visible and because the focus point of each parabolic highly reflective coating coincides with the center of its related semi-spherical lens segment, parallel rays of light passing perpendicularly through the flat reverse surface of said transparent plate and striking the aforementioned segmental paraboloid reflectors will be focused through the surfaces of the said segmental spherical lenses at a perpendicular angle at each point of the surface of said segmental spherical lenses.

References Cited in the file of this patent

UNITED STATES PATENTS

| | | |
|---|---|---|
| 258,232 | Ingalls | May 23, 1882 |
| 586,220 | Basquin | July 13, 1897 |
| 2,292,152 | Newcomer | Aug. 4, 1942 |
| 2,378,252 | Staehle et al. | June 12, 1945 |

FOREIGN PATENTS

| | | |
|---|---|---|
| 581,014 | France | Sept. 17, 1924 |